(12) United States Patent
Hansen

(10) Patent No.: US 7,338,277 B2
(45) Date of Patent: Mar. 4, 2008

(54) STAMPING DEVICE

(76) Inventor: Bernd Hansen, Talstr. 22-30, 74429 Sulzbach-Laufen (DE)

( * ) Notice: Subject to any disclaimer, the term of this patent is extended or adjusted under 35 U.S.C. 154(b) by 0 days.

(21) Appl. No.: 10/560,111

(22) PCT Filed: Mar. 4, 2004

(86) PCT No.: PCT/EP2004/002158

§ 371 (c)(1),
(2), (4) Date: Dec. 9, 2005

(87) PCT Pub. No.: WO2004/113054

PCT Pub. Date: Dec. 29, 2004

(65) Prior Publication Data

US 2006/0137547 A1    Jun. 29, 2006

(30) Foreign Application Priority Data

Jun. 24, 2003  (DE) ............................... 103 28 198

(51) Int. Cl.
*B29C 35/08* (2006.01)

(52) U.S. Cl. ............... 425/397; 425/385; 425/407; 264/220; 264/227; 264/293

(58) Field of Classification Search ............... 425/384, 425/385, 394, 397, 407; 249/140, 136; D18/16, D18/54; 264/220, 227, 293
See application file for complete search history.

(56) References Cited

U.S. PATENT DOCUMENTS

| 1,408,685 A | * | 3/1922 | Benson ........................ 249/140 |
| 1,958,184 A | * | 5/1934 | Cross ........................... 425/89 |
| 2,836,867 A | * | 6/1958 | Bean ........................... 164/24 |
| 2,872,861 A | | 2/1959 | Smith |
| 3,627,861 A | | 12/1971 | Timke |
| 4,882,173 A | * | 11/1989 | LaRoche et al. ............ 425/130 |
| 5,051,083 A | * | 9/1991 | Coluzzi ............... 425/174.8 R |
| 5,853,606 A | * | 12/1998 | Boskovic .................... 249/103 |
| 6,877,426 B1 | * | 4/2005 | Huang ........................ 101/334 |
| 2005/0064054 A1 | * | 3/2005 | Kasumi ...................... 425/112 |
| 2005/0093204 A1 | * | 5/2005 | Gregg ........................ 264/284 |
| 2006/0001193 A1 | * | 1/2006 | Booth ........................ 264/319 |

FOREIGN PATENT DOCUMENTS

| DE | 894 974 C | 10/1953 |
| DE | 42 41 210 A | 6/1994 |
| EP | 0 320 667 A2 | 6/1989 |
| EP | 0 443 292 A1 | 8/1991 |
| GB | 704 949 A | 3/1954 |
| JP | 63295234 A | 12/1988 |

* cited by examiner

*Primary Examiner*—Yogendra N. Gupta
*Assistant Examiner*—Dimple N. Bodawala
(74) *Attorney, Agent, or Firm*—Roylance, Abrams, Berdo & Goodman, L.L.P.

(57) ABSTRACT

A stamping device stamps characteristic data, especially in the form of code numbers (22), into plastic products. Such containers are preferably produced according to blowing, filling and gelling methods. At least one stamp (32), having a stamping unit (34) with interchangeable characteristic data units (42), is guided in the longitudinal direction in the frame (24) of the device. When the stamp is in an elevated position, the products to be stamped and/or have been stamped can be fed or removed. When in a lowered position, the products are stamped.

13 Claims, 3 Drawing Sheets

STAMPING DEVICE

FIELD OF THE INVENTION

The present invention relates to a stamping device for stamping identification data, especially in the form of code numerals, in plastic products such as containers which have been produced preferably by a blow-fill-seal process.

BACKGROUND OF THE INVENTION

Processes and molding devices for production of containers have been disclosed in the prior art (DE 199 26 329 A1). A tube of plasticized plastic material is extruded into a molding device. One end of the tube is closed by welding. A pneumatic pressure gradient acting on the hose is generated to expand the hose and is applied for the purpose of forming the container on a shaping wall of the molding device consisting of two form tools positioned opposite each other. A suitable filling mandrel is then used to fill the plastic container under sterile conditions. After the filling mandrel has been removed, the container is hermetically sealed with a definable head geometry being formed. Two container shaping jaws are moved toward each other by hydraulic or electromotive drive means to obtain a closed position and away from each other and into an open position to obtain the plastic container itself in which fluid is subsequently stored.

The head geometries generated by the two separately controlled jaws also generally include the neck element of the plastic container, including one in the form of an ampule. The ampule is closed by a head piece and may be opened at a separation point for removal of fluid after the head piece has been separated by a toggle element molded on it over the separation point, and thus, removed from the plastic container proper.

Processes and devices for execution of these processes have been disclosed in a plurality of embodiments and are widely used in packaging systems for liquid or paste products, as for example in the well-known Bottelpack® system.

EP 0 359 971 B1 discloses a comparable blow-fill-seal process for production of hollow containers of plastic. Two halves are molded and welded together in a tool. A frame-shaped hollow element is molded and welded in the same way as the containers themselves from a waste edge zone of the containers (ampules). The containers are configured in sequence in a strip.

In the above disclosed processes, the possibility exists of applying identification data, especially in the form of code numerals. Among other things, that data may indicate the place and date of production, the contents, the amount contained in the respective container and any expiration dates of the contents of a container. Placement of the data can be on the toggle element itself by which the sealing head piece is separated from the container for the process of removal of the contents or in the area of the edge waste zone surrounding the respective container and sold with the respective container as a sale unit. The respective identification data may also be present uncoded as information for end users, but are predominantly present in coded form for presentation of information content to producer and intermediate purchaser circles, and are applied in the disclosed processes in the production machine itself. The code numerals are fitted into the molding halves before the blow-fill-seal process is carried out so that the code numerals may be impressed into the respective container directly in the molding process. Since the production machines involved may easily have ten or more single-use molds, it may take several hours or even an entire day to replace the code numerals in the form of die plates or individual type which are to be fitted into the mold. Such expenditure of time is necessary in particular if one production machine is to apply different code numerals to the various molds as required by the production process. Since application of the code numerals inside the molds by hand is a very complicated process, it is also possible that a single error, such as application of an incorrect code numeral in the mold, may make it necessary to halt the production process and dispose all the containers produced up to that point by the production machine in the process. In such exchange processes the machine for producing the containers is not available, resulting in high operating costs.

SUMMARY OF THE INVENTION

Objects of the present invention are to provide improved molding processes and devices where an exchange process of the identification data for plastic containers may be carried out in a simple and cost-effective manner, and especially so that the production process itself for plastic containers is not impaired as a result.

These objects are basically attained by a stamping device for stamping identification data, especially in the form of code numerals, in plastic products such as containers produced by a blow-fill-seal process. A frame of the device comprises at least one stamp having a stamping unit with replaceable identification data mounted so that it may be displaced horizontally. When in a raised position, products can be moved toward and away from the stamping unit, which products are to be stamped or have been stamped. When in a lowered position, the stamping unit effects stamping of the products.

The stamping device is mounted outside the production machine proper for execution of the blow-fill-seal process. The containers are first fully produced, filled, and sealed before they are moved further to the stamping device for stamping of identification data. The stamping device of the present invention, with its frame structure and the stamp, permits very high rates of output of goods to be stamped. As a rule, the stamping process may basically be disconnected from the production process proper in time and space by the stamping device. In addition, because of its frame structure the stamping device is very easily accessible from the exterior, and a process of exchange of identification data for the containers (ampules) in rapid succession and with little adjustment effort may be achieved. The latter is a factor in particular if, as a result of incorrect selection of code numerals, the stamping processes must be interrupted and the incorrect code numerals, replaced with the correct ones. From the viewpoint of safety engineering the stamping device is easy to control. When supplemented by safety engineering system elements, it may help prevent hazardous conditions for operating personnel.

In one preferred embodiment of the stamping device of the present invention, the plastic material and/or the stamping unit is/are heated for stamping of the identification data. Thus, the residual heat of the plastic product following application of heat and pressure in the process of its production may be used for stamping by the stamping unit. It is also possible, however, to heat the stamping unit additionally to stamp the identification data required in the cooled plastic product with the heated stamping unit.

It has been found to be especially advantageous to deliver and remove the plastic product in the direction transverse to that of stamping with the stamp and to employ a stamp support supporting the plastic product. The stamp support is moved simultaneously with the stamp or desynchronized from it in the opposite direction of movement. This configuration makes it possible to operate the production machine at high speeds of output of plastic products safely and at the same speed of production as that of the machine.

In another preferred embodiment of the stamping device of the present invention, the frame has columnar guides for longitudinal movement of the plate-like stamping unit and a support plate for the stamp. The frame structure of the stamping device is reinforced by the columnar guides, so that high accuracy may be achieved in stamping processes, along with clearly recognizable identification data. In addition, the stamping forces generated by the stamping process are reliably transmitted to the frame of the stamping device by the columnar guides. Preferably, the plate-like stamping unit and the support plate are adjacent to and face each other and the piston rods of the stamping plate and the support plate engage the associated plate. Their housing element is rigidly connected to the frame. In this way, the base structure of the frame with the columnar guides may be additionally rigidified by the housing element stamp configured as an operating cylinder. Hydraulic or pneumatic cylinders, as well as electric motor operators with spindle drives, may be employed as operating cylinders for the stamp and stamp support.

In another preferred embodiment of stamping device of the present invention, a guide plate is connected to the frame by a columnar suspension and mounted between the plate-like stamping unit and support plate. This guide plate guides the plastic products for a stamping process within the frame. The guide plate makes certain that the plastic products to be stamped reach a precisely definable stamping position inside the stamping device and that components not provided for stamping do not inadvertently undergo the stamping process and possibly are damaged. In addition, the guide plate together with the support plate serves as a support for the plastic product during the stamping process.

To allow the greatest possible number of stamping processes to be carried out with the plastic products, in one preferred embodiment of the stamping device of the present invention, the plastic products in the form of ampules are configured as containers connected to each other in a strip by a (waste) edge zone, and are stamped in succession with several adjacent ampules being provided simultaneously with the stamp.

Other objects, advantages and salient features of the present invention will become apparent from the following detailed description, which, taken in conjunction with the annexed drawings, disclose a preferred embodiment of the present invention.

BRIEF DESCRIPTION OF THE DRAWINGS

Referring to the drawings which form a part of this disclosure.

DETAILED DESCRIPTION OF THE INVENTION

Figure 3:
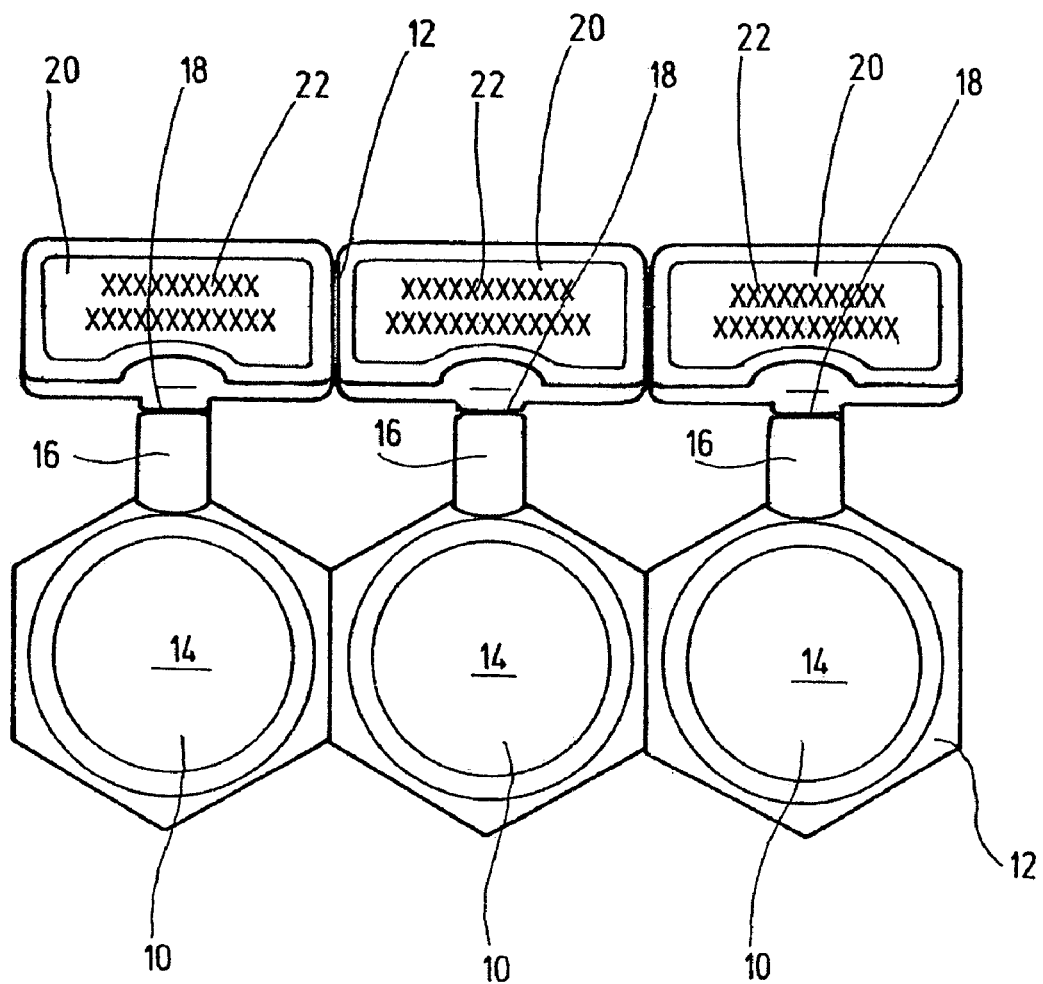
FIG. 3 is a top plan view of a strip of (three) containers in succession with toggle elements as sealing pieces on the head side provided with identification data with the spaces identified by X provided with any desired code numerals or letters or also ones in decoded form, according to the present invention.

The plastic product shown in FIG. 3 has three containers 10 interconnected in sequence in a strip by an edge zone 12, also of plastic. The interior 14 of the container 10 is filled with a fluid such as one in the form of a pharmaceutical preparation or the like. A neck element 16 is sealed by a toggle seal or a toggle seal element 20. A separation point 18 facilitates the opening of the container. The edge waste zone of flat plastic material possibly still present between edge zone 12 with neck element and the toggle seals 20 as shown in FIG. 3 is removed, preferably by punching. The toggle seal 20 is configured to be flat and permits easy opening of the container 10 by manual separation (rotation) of the toggle seal by the separation point 18 from the associated neck element 16.

Such containers 10 are produced by the above disclosed processes and molding devices (not shown), ones in which a tube of plasticized material is extruded into a molding device. One end of the tube is sealed by heat sealing. As a result of generation of a pneumatic pressure gradient acting on the tube, the tube is expanded and applied to a shaping wall of the molding device having two opposite molding tools (not shown) for the purpose of forming the container. The plastic container 10 is then filled under sterile conditions in the molding device by a suitable filling mandrel (not shown). After the filling mandrel has been removed, the tube is then hermetically sealed to form the definable head geometry illustrated in FIG. 3. Such processes and molding devices are of the prior art and are described, for example, in DE 199 26 329 A1 and in EP 0 359 971 B1, and accordingly, will not be discussed further here.

Code numerals 22 are applied to the surfaces of the toggle seal elements 20. Crosses or the letter X are used as placeholders to indicate the spaces reserved for the identification data in the form of code numerals. In place of the placeholders indicated by X, any identification and manufacturing data can be used and may provide information as numbers or numerals in coded form to experts at large. Such information may relate to the place and mode of production, expiration dates, fluid contents, etc. The code numerals 22 may also provide information to end users in uncoded form concerning expiration dates, names of manufacturers, or the like. The possibility also exists of dying the code numerals 22 to attract the attention of the user to the display field containing the identification data. In addition, illustrations such as pictographs, for example, may be used to indicate clearly that the contents or the like are to be administered only orally. Directions for use or parts of them may also be reproduced by stamping in the identification data field.

The stamping device by means for applying identification data, such as code numerals 22, to container elements will now be described with reference to FIGS. 1 and 2. Application of the code numerals 22 to the toggle seals 20 as shown in FIG. 3 is presented exclusively by example. Thus, for example, the identification data may also be applied to edge zones and waste edge zones in conjunction with the containers 10, or the identification data may be applied directly to the container 10 in areas which include the interior of the container 10 with its fluid or other medium. In the latter case, the stamping processes are to be conducted with suitable care to prevent stamping through the container 10, something which might cause the contents of the container to be unusable. A plurality of potential container configurations can be used with the present invention, including ampules or syringes, so that the exemplary embodiment shown in FIG. 3 represents only one option among a decidedly large number of alternatives for containers produced by the blow-fill-seal process.

Figure 1:
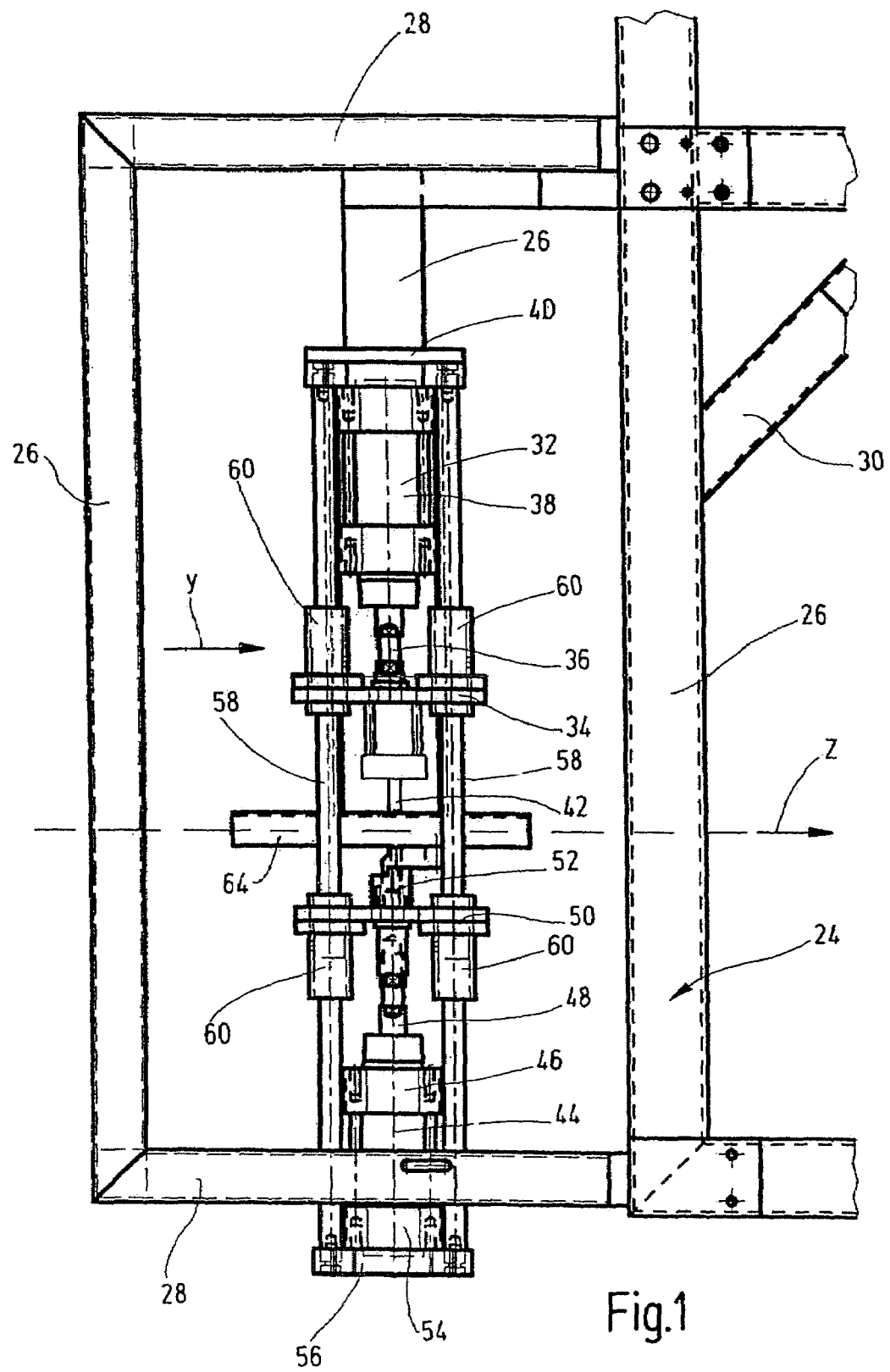
FIG. 1 is a side elevational view of the basic components of a stamping device according to an embodiment of the present invention, as seen in the direction of the arrow X in FIG. 2.
Figure 2:
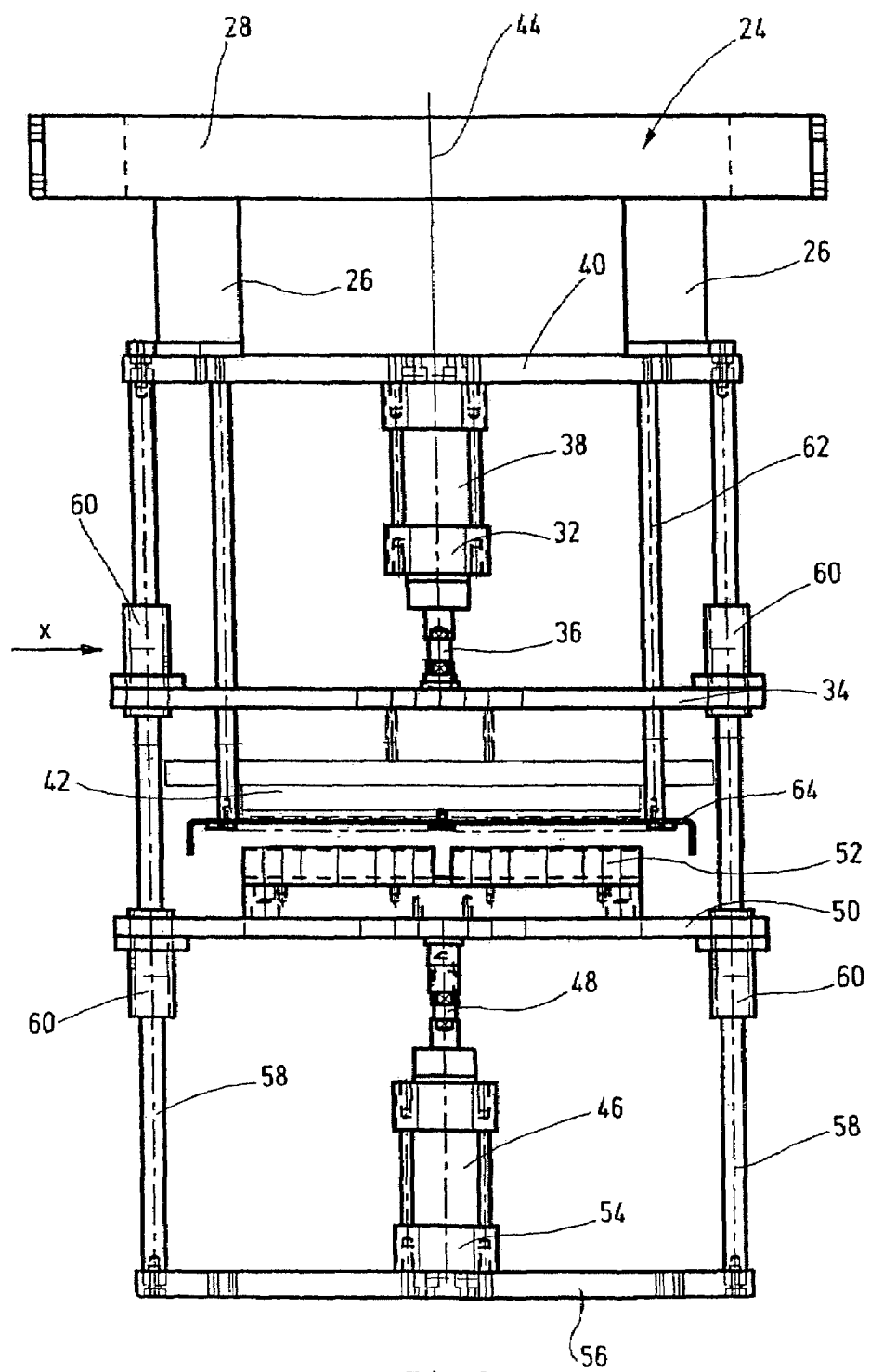
FIG. 2 is a front elevational view of the stamping device of FIG. 1, as seen in the direction of the arrow Y in FIG. 1.

The stamping device shown in FIGS. 1 and 2 for stamping identification data, especially those in the form of code numerals 22, in plastic products such as containers 10 or ampules produced preferably by a blow-fill-seal process, has a frame 24 made up of longitudinal supports 26 and transverse supports 28. Only part of the frame elements is shown in the illustration in order that the essential components of the device may be more clearly illustrated. The frame 24 may have longitudinal supports 26 and transverse supports 28, but may also have individual spars which are welded together, joined by a threaded connection, or riveted to each other and optionally further reinforced by crossarm braces 30 to form a kind of box-type frame in which the movable machine elements of the stamping device are received and fastened.

A stamp 32 with a plate-like stamping unit or stamping plate 34 is mounted in the frame 24 of the device. This stamp 32 is configured as a working cylinder and is provided with a retractable and extensible piston rod 36. The free end of rod 36 engages the plate-like stamping unit 34. The housing element 38 of the working cylinder (stamp 32) is mounted on a frame plate 40, which, as viewed in FIG. 2, extends in parallel with the upper transverse support 28 and is held by the two longitudinal supports 26 a specific distance vertically from the transverse support 28. The stamping unit 34 has, on its lower side, identification data units 42 designed to be replaceable. That is, individual code numerals 22 or letters or even pictoral symbols may be replaced as individual type or die plates as parts of the strip of identification data. The identification data may be configured as groups of information content positioned side by side or one above the other so that the stamped image is in the form of an identification data field, as is shown in FIG. 3 for the plastic product, X identifying the empty space holders or data.

When the stamp 32 with stamping unit 34 and identification data units 42 has been raised, the products such as the containers 10 to be stamped are placed in position in the stamping device and/or stamped products are removed from the stamping device. The stamping process itself is carried out with the stamp 32 lowered as shown in FIGS. 1 and 2. The identification data units 42 are then in contact with the identification data field, in this instance with the flat parts of the toggle seal 20 as illustrated in FIG. 3.

For the purpose of stamping the identification data, the plastic product is heated as a function of production or the stamping unit 34 is heated by a heating unit (not shown). In addition, the direction of delivery and removal of the plastic product is indicated in FIG. 1 by an arrow Z. Accordingly, unstamped products as viewed in FIG. 1 move from the left through the stamping unit 34 in the center of the device to be stamped. After being stamped, the products move to the right from the stamping device for further handling, for example, to a packing machine (not shown). Consequently, the direction Z of delivery and removal of the plastic product is oriented transversely to the direction of stamping with the stamp 32, which moves the stamping unit 34 vertically along the longitudinal axis 44 of the device as viewed in FIGS. 1 and 2 (see FIG. 2).

As shown in the illustrations, a support stamp 46 is provided, and may be moved in the opposite direction simultaneously or desynchronized from the stamp 32. The support stamp 46 also has a working cylinder operated by hydraulic, pneumatic, or electric means and having a piston rod 48. The free end of piston rod 48 is mounted to the support plate 50 with a support element 52 positioned on it. In addition, the support stamp 46 has a housing element 54 rigidly connected to a lower frame plate 56. The linear movement of the support stamp 46 is also oriented in directions along the longitudinal axis 44 of the stamping device as a whole. Inside the frame 24, four columnar guides or guide columns 58 extend in parallel with the longitudinal axis 44 of the stamping device. The free ends of columnar guides 58 are mounted in pairs in the upper frame plate 40 and the lower frame plate 56. Both the plate-like stamping unit 34 and the support plate 50, with their rectangular cross-sections, are mounted by guide sleeves 60 on the columnar guides 58. When the stamp 32 and support stamp 46 are moved into and out of position, the plates move along with them, while the housing elements 38 and 54 are kept stationary in the frame 24.

In FIG. 1, in the respective side view, the columnar guides 58 are mounted immediately adjacent to the stamp 32 and support stamp 46 so that rigidification of the stamping device as a total system is largely achieved. The plate-like stamping unit 34 and the support plate 50 are adjacent and face each other. The piston rods 36 and 48 of the stamp 32 and support stamp 46 engage the stamping unit 34 and support plate 50. Their housing elements 38 and 54 are mounted on the frame 24 so as to be stationary. A guide plate 64 is rigidly connected to the frame 24 by a column suspension 62 having four columns. This guide plate 64 is mounted between plate-like stamping unit 34 and support plate 50 and guides the plastic products, as shown by example in FIG. 3, for a process of stamping with the identification data inside the frame 24. Additional rigidification of the overall stamping device system is achieved by guide plate 64. The containers 10 may be guided with precision through the suspended guide plate 64 so that blurred stampings or erroneous stampings may be reliably prevented.

The configuration of stamping unit 34 and support stamp 46 may also be reversed inside the device. Optionally, the support stamp 46 may be designed as another stamping unit if stamping of plastic products on both sides inside the stamping device is desired. The stamping temperature selected for the respective plastic product is to be one which permits a reliable stamping process without damage to the plastic material, such as by running or burning. The stamping temperatures may accordingly be varied as a function of the plastic material employed and the strength of the material used for the plastic product.

The stamping device illustrated in FIGS. 1 and 2 may be connected in series to a production machine, in particular for a blow-fill-seal process with plastic products. The amounts of product obtained from the production machine may be conducted more or less continuously through the stamping station and provided with stamps. The stamping device may optionally be combined with a punching unit (not shown) which removes a possible edge waste zone from the respective plastic product. The option also exists, however, of mounting the stamping device between a production machine and a punching unit. The timing selected may be such that the plastic products produced are punched when the conveyor chain for these products is halted. Stamping of the respective plastic product is effected at the preceding or upstream station. The possibility also exists of subjecting the stamping to optoelectronic monitoring to determine if the stamp is complete and easy to read. Should this quality criterion not be met, the plastic products found not to meet it may be removed as defective elements from subsequent or downstream movement in the direction of the packaging station.

While one embodiment has been chosen to illustrate the invention, it will be understood by those skilled in the art that various changes and modifications can be made therein without departing from the scope of the invention as defined in the appended claims.

What is claimed is:

1. A stamping device for imprinting identification data in plastic products, comprising:
    a stationary support frame having columnar guides and a longitudinal axis, said guides being parallel to said longitudinal axis;
    a first stamp having a first housing element stationarily mounted on said frame and having a first piston rod movable in a first direction along said longitudinal axis relative to said frame;
    a stamping plate with replaceable identification units coupled to said first piston rod with at least one of the plastic products and said stamping plate being heated, said stamping plate being movably mounted on said guides for guided movement along said longitudinal axis relative to said guides;
    a support stamp having a support housing element stationarily mounted on said frame and having a support piston rod movable in a second direction along said longitudinal axis relative to said frame, said second direction being opposite to said first direction, movement of said support piston rod being one of simultaneous with and desynchronized relative to movement of said first piston rod; and
    a support plate coupled to said support piston rod and being movably mounted on said guides for guided movement along said longitudinal axis relative to said guides, said stamping plate and said support plate being adjacent to and facing one another;
    whereby, said stamping plate and said support plate are movable between open positions for delivering and removing the plastic products and closed positions to effect stamping of the plastic products.

2. A stamping device according to claim 1 including means for receiving plastic products in the form of containers produced by a blow-fill-seal process.

3. A stamping device according to claim 1 including means for allowing delivery and removal of the plastic products in a direction transverse to said longitudinal axis.

4. A stamping device according to claim 1 including means for allowing delivery and removal of the plastic products in a direction one of parallel and transverse to said longitudinal axis.

5. A stamping device according to claim 1 wherein a guide plate is fixedly connected to said support frame by a column suspension and is mounted between said stamping plate and said support plate, said guide plate guiding the plastic products for a stamping process in said support frame.

6. A stamping device according to claim 1 including means for receiving the plastic products in the form of ampules connected in a strip by an edge zone for stamping in succession by said identification units.

7. A stamping device according to claim 6 including means for receiving a plurality of said ampules for simultaneous stamping.

8. A stamping device for imprinting identification data in plastic products, comprising:
    a stationary support frame having columnar guides and a longitudinal axis, said guides being parallel to said longitudinal axis;
    a first stamp mounted on said frame for movement in a first direction along said longitudinal axis relative to said frame relative to said frame;
    a stamping plate with replaceable identification units coupled to said first stamp with at least one of the plastic products and said stamping plate being heated, said stamping plate being movably mounted on said guides for guided movement along said longitudinal axis relative to said guides;
    a support stamp mounted on said frame for movement in a second direction along said longitudinal axis relative to said frame, said second direction being opposite to said first direction, movement of said support stamp being one of simultaneous with and desynchronized relative to movement of said first stamp;
    a support plate coupled to said support stamp and being movably mounted on said guides for guided movement along said longitudinal axis relative to said guides; and
    a guide plate fixedly connected to said support frame by a column suspension and mounted between said stamping plate and said support plate, said guide plate guiding the plastic products for a stamping process in said support frame;
    whereby, said stamping plate and said support plate are movable between open positions for delivering and removing the plastic products and closed positions to effect stamping of the plastic products.

9. A stamping device according to claim 8 including means for receiving said plastic products in the form of containers produced by a blow-fill-seal process.

10. A stamping device according to claim 8 including means for allowing delivery and removal of the plastic products in a direction transverse to said longitudinal axis.

11. A stamping device according to claim 8 including means for allowing delivery and removal of the plastic products in a direction one of parallel and transverse to said longitudinal axis.

12. A stamping device according to claim 8 including means for receiving the plastic products in the form of ampules connected in a strip by an edge zone for stamping in succession by said identification units.

13. A stamping device according to claim 12 including means for receiving a plurality of said ampules for simultaneous stamping.

* * * * *